(12) United States Patent  (10) Patent No.: US 7,986,878 B2
Saunders et al.  (45) Date of Patent: Jul. 26, 2011

(54) ADJUSTABLE BIT RATE OPTICAL TRANSMISSION USING PROGRAMMABLE SIGNAL MODULATION

(75) Inventors: Ross Alexander Saunders, Ontario (CA); Roberto Marcoccia, San Jose, CA (US); Steven Keck, Mountain View, CA (US); Theodore J. Schmidt, Gilroy, CA (US); Christian Malouin, San Jose, CA (US)

(73) Assignee: Opnext Subsystems, Inc., Los Gatos, CA (US)

( * ) Notice: Subject to any disclaimer, the term of this patent is extended or adjusted under 35 U.S.C. 154(b) by 754 days.

(21) Appl. No.: 12/026,545

(22) Filed: Feb. 5, 2008

(65) Prior Publication Data

US 2009/0196602 A1  Aug. 6, 2009

(51) Int. Cl.
H04B 10/08 (2006.01)
(52) U.S. Cl. .............................. 398/26; 398/25; 398/27
(58) Field of Classification Search .............. 398/9, 185, 398/25–27
See application file for complete search history.

(56) References Cited

U.S. PATENT DOCUMENTS

| | | | |
|---|---|---|---|
| 5,541,955 A * | 7/1996 | Jacobsmeyer | 375/222 |
| 6,904,082 B2 * | 6/2005 | Jones | 375/220 |
| 7,280,767 B1 | 10/2007 | Ho et al. | |
| 2002/0064233 A1 * | 5/2002 | Terreault et al. | 375/261 |
| 2002/0159121 A1 | 10/2002 | Spickermann | |
| 2006/0291863 A1 * | 12/2006 | Chan et al. | 398/115 |
| 2007/0206963 A1 * | 9/2007 | Koc | 398/202 |
| 2007/0230594 A1 * | 10/2007 | Mo et al. | 375/260 |
| 2007/0268814 A1 | 11/2007 | Li | |
| 2008/0225380 A1 | 9/2008 | Heffner et al. | |
| 2008/0225381 A1 | 9/2008 | Heffner et al. | |
| 2008/0226306 A1 | 9/2008 | Heffner et al. | |
| 2008/0231941 A1 | 9/2008 | Malouin et al. | |
| 2008/0232821 A1 | 9/2008 | Malouin et al. | |
| 2009/0116851 A1 | 5/2009 | Heffner et al. | |
| 2009/0136240 A1 | 5/2009 | Malouin et al. | |

FOREIGN PATENT DOCUMENTS

EP  1 394 968  3/2004
JP  2005-079826  3/2005

OTHER PUBLICATIONS

International Search Report and Written Opinion dated Aug. 20, 2009 for International Application No. PCT/US2009/033273, filed Feb. 5, 2009 (8 pages).

* cited by examiner

*Primary Examiner* — Dzung D Tran
(74) *Attorney, Agent, or Firm* — Fish & Richardson P.C.

(57) ABSTRACT

Techniques, apparatus and systems to provide adjustable bit rate optical transmission using programmable signal modulation in optical communication systems.

32 Claims, 11 Drawing Sheets

ADJUSTABLE BIT RATE OPTICAL TRANSMISSION USING PROGRAMMABLE SIGNAL MODULATION

BACKGROUND

This application relates to optical communications.

Optical communications use an optical modulator to modulate an optical carrier beam to carry digital bits for transmission over an optical link. An optical communication system can use optical wavelength division multiplexing (WDM) to transmit multiple optical carriers modulated to carry different optical data channels through a single fiber.

The performance of optical transmission can be characterized by various parameters, such as the optical signal to noise ratio (OSNR), the data bit error rate (BER) and the data bit rate per wavelength or data spectral efficiency. The signal quality of an optical WDM signal may be degraded by various effects in the optical transmission such as optical attenuation effects in fiber and optical dispersion effects including chromatic dispersion (CD), polarization mode dispersion (PMD) and polarization dependent loss (PDL) in fiber. Some techniques to mitigate degradation of optical signals in transmission use optical compensation devices in the optical transmission paths such as optical amplifiers against signal attenuation and dispersion compensation devices. Other techniques use various signal modulation techniques to generate modulated data formats that can tolerate signal degradation effects in optical transmission such as the fiber dispersion.

SUMMARY

This application describes, among others, techniques, apparatus and systems to provide adjustable bit rate optical transmission using programmable signal modulation in optical communication systems. In one aspect, a method for optical communications includes operating an optical transmitter to provide a plurality of different signal modulation formats with different data bit rates in controlling signal modulation in generating an optical channel signal; operating the optical transmitter to select one signal modulation format from the plurality of different signal modulation formats to control the signal modulation based on a condition of an optical transmission link that transmits the optical channel signal; and operating the optical transmitter to select another signal modulation format from the plurality of different signal modulation formats to control the signal modulation when the condition of the optical transmission link changes.

One implementation of the above method for optical communications includes operating a programmable optical transmitter to provide a plurality of different quadrature amplitude modulation (QAM) constellations with different data bit rates in controlling signal modulation of an optical channel signal with a variable data bit rate selected from the QAM constellations; operating the optical transmitter to select one of the QAM constellations to control the signal modulation based on a condition of an optical transmission link that transmits the optical channel signal; and operating the optical transmitter to select another one of the QAM constellations to control the signal modulation when the condition of the optical transmission link changes.

In another aspect, a system for optical communications includes an optical transmitter comprising a digital signal processing unit that is programmed to include a plurality of different signal modulation formats with different data bit rates in controlling signal modulation in generating an optical channel signal; an optical transmission link in communication with the optical transmitter to transmit the optical channel signal; an optical receiver in communication with the optical transmission link to receive the optical channel signal from the optical transmitter; and a feedback mechanism that communicates to the optical transmitter a feedback signal indicative of a condition of the optical transmission link in transmitting the optical channel signal form the optical transmitter to the optical receiver. The optical transmitter responds to the feedback signal to select one signal modulation format from the plurality of different signal modulation formats to control the signal modulation based on the condition and selects another signal modulation format to control the signal modulation when the condition of the optical transmission link changes.

In one implementation, a system for optical communications includes an optical transponder comprising a plurality of programmable optical transmitters to produce optical WDM channel signals at different optical WDM wavelengths. Each programmable optical transmitter comprises a digital signal processing unit that is programmed to include a plurality of different quadrature amplitude modulation (QAM) constellations with different data bit rates in controlling signal modulation of an optical WDM channel signal with a variable data bit rate selected from the QAM constellations. This system includes an optical transmission network connected to optical transponder to transmit the optical WDM channel signals, at least one optical receiver in the optical transmission network to receive at least one of the optical WDM channel signals from the optical transponder and comprising a coherent QAM detection mechanism to extract data from the received optical WDM channel signal; and a feedback mechanism in the optical transmission network to communicate to the optical transponder a feedback signal indicative of a condition of an optical transmission link that transmits the at least one optical WDM channel signal form the optical transponder to the optical receiver. In this system, the optical transponder responds to the feedback signal to select one QAM constellation from the QAM constellations to control the signal modulation in a respective programmable optical transmitter based on the feedback signal and selects another QAM constellation to control the signal modulation in the respective programmable optical transmitter when the condition of the optical transmission link changes.

In yet another aspect, a method for optical communications includes connecting programmable optical transponder in an optical communication network, where each programmable optical transponder comprises a plurality of programmable optical transmitters to produce optical WDM channel signals at different optical WDM wavelengths and a plurality of optical receivers for detecting optical WDM channel signals. Each programmable optical transmitter comprises a digital signal processing unit that is programmed to include a plurality of different quadrature amplitude modulation (QAM) constellations with different data bit rates in controlling signal modulation of an optical WDM channel signal with a variable data bit rate selected from the plurality of the QAM constellations. This method includes obtaining performance information for each optical path link for each of the optical WDM channel signals produced by a programmable optical transponder; operating each of the programmable optical transmitters in each optical transponder under a selected QAM constellation that is selected from the plurality of the QAM constellations in the digital processing unit of the programmable optical transmitter based on the performance information for the respective optical path link; providing a feedback mechanism in the optical network to communicate to the optical transponder a feedback signal indicative of a change of the performance of the optical path link for each optical WDM channel signal from a respective programmable optical transmitter; and operating a programmable optical transmitter to change a selected QAM constellation currently in use to a different QAM constellation when the respective change of the performance of the optical path link meets a pre-determined condition for changing the QAM constellation.

In yet another aspect, a method for optical communications includes providing a plurality of programmable optical transmitters in an optical node in a network. Each programmable optical transmitter includes a plurality of different quadrature amplitude modulation (QAM) constellations with different data bit rates and operates to control signal modulation of an optical channel signal with a variable data bit rate selected from the QAM constellations. This method includes determining optical transmission performance of optical path links for transmitting optical channel signals from the optical transmitters in the optical node, respectively, based on at least one of an optical path link length and an optical signal to noise ratio for each of the optical path links to select one of the QAM constellations for each optical transmitter to control the signal modulation; and operating the optical transmitters in the optical node under the selected QAM constellations with different data bit rates.

These and other implementations and their variations are described in detail in the attached drawings, the detailed description and the claims.

DETAILED DESCRIPTION

Examples of techniques, apparatus and systems described in this application provide adjustable bit rate optical transmission using programmable signal modulation at an optical transmitter. As an example, a digital signal processing unit can be provided to control the optical modulation in the optical transmitter so that different data modulation formats with different data bit rates, different data spectral efficiencies and different OSNR sensitivity levels can be used in the optical transmitter based on the system requirements on the specific optical WDM signal of the optical transmitter. Therefore, a single optical transmitter can be operated in an adjustable manner, in response to versatile operating conditions and system requirements, to maintain a desired level of transmission performance or optimize the transmission performance without the need for replacing the optical transmitter. Such optical transmitters and respective optical receivers can also be used to upgrade optical communication systems with higher bandwidths and improved spectral efficiency by replacing inadequate optical transmitters and optical receivers without replacing the optical backbone structures of the networks.

Figure 1A:
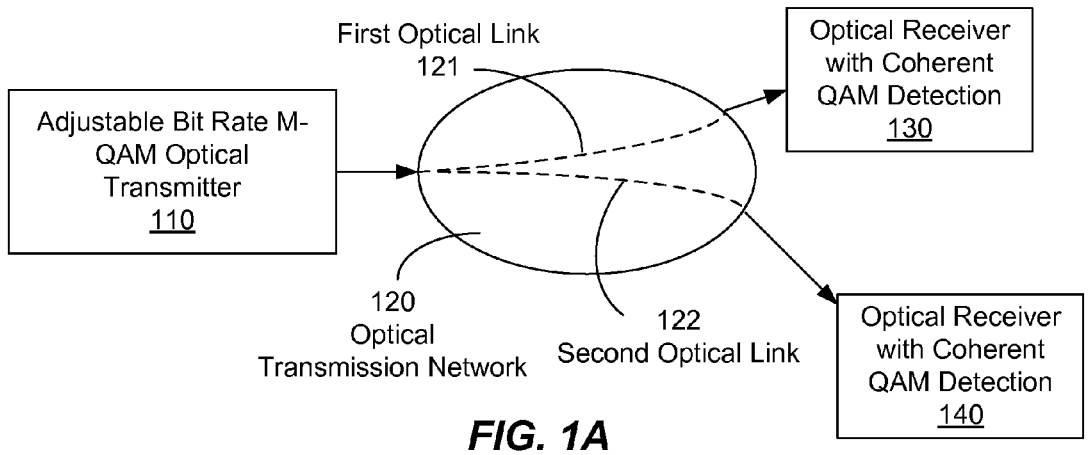
FIG. 1A illustrates an example of an optical communication system that implements the present adjustable bit rate optical transmission using programmable signal modulation.

FIG. 1A illustrates an example of an optical communication system that implements the present adjustable bit rate optical transmission using programmable signal modulation. An adjustable bit rate optical transmitter 110 is shown to be connected in an optical transmission link or network 120 to send an optical WDM signal to one or more optical receivers 130 and 140. The adjustable bit rate optical transmitter 110 includes a digital signal processing (DSP) unit that is programmed to have different signal modulation formats with different data bit rates and controls the signal modulation format of the output optical WDM signal from the transmitter 110. Various quadrature amplitude modulation (QAM) with different levels (M) of modulation and different data bit rates, for example, can be programmed in the digital signal processing unit of the transmitter 110. Different M-QAM constellations with a fixed baud rate can be used.

Figure 1B:
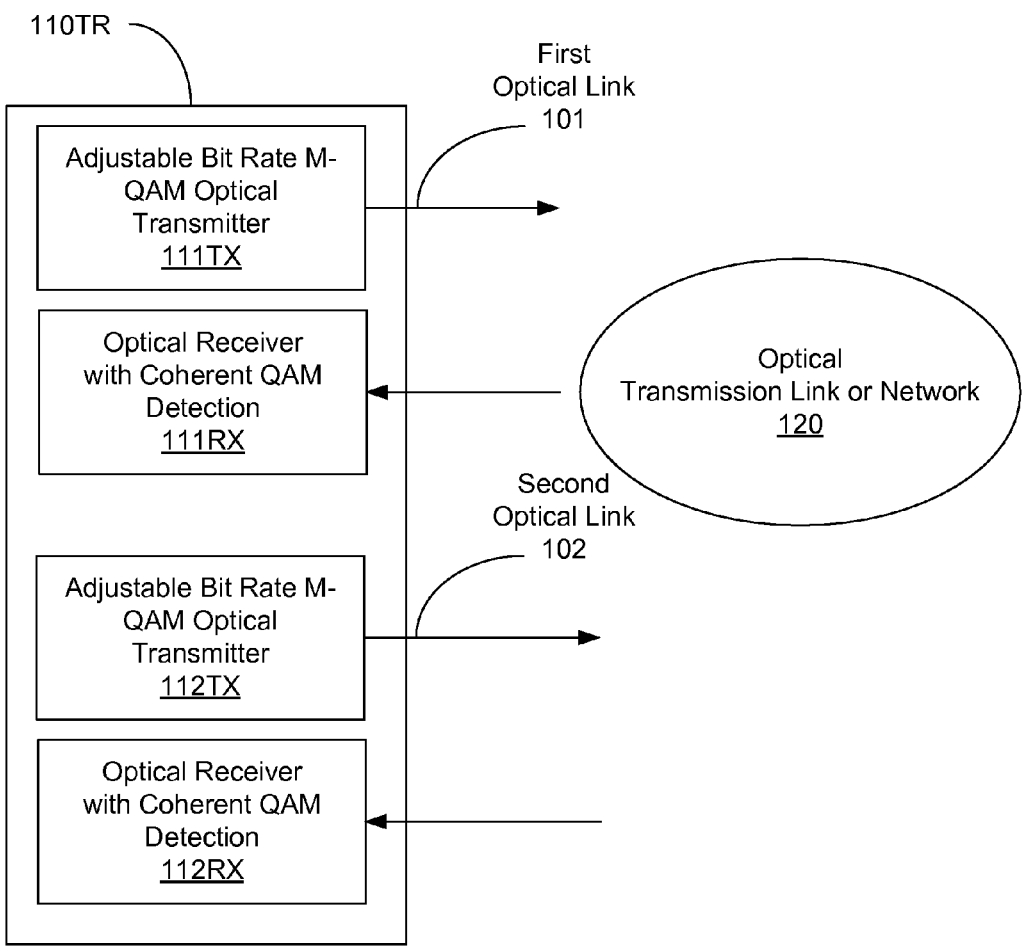
FIG. 1B illustrates an optical transponder in the system in FIG. 1A with programmable adjustable bit rate optical transmitters and corresponding optical receivers for different optical WDM wavelengths.

In various optical communication systems, such an adjustable bit rate optical transmitter 110 can be part of an optical transponder that also includes an optical receiver for receiving an optical WDM signal. The adjustable bit rate optical transmitter 110 operates to adjust its signal modulation format selected from multiple signal modulation formats with different data bit rates based on the optical transmission requirements for its output optical WDM channel. FIG. 1B illustrates an optical transponder 110TR connected to the optical link or network 120 with two adjustable bit rate optical transmitters 111TX and 112TX operating at two different optical WDM channel wavelengths for two different optical links 101 and 102 in the network 120, respectively. In this example, two optical receivers 111RX and 112RX are paired with the transmitters 111TX and 112TX, respectively. Each optical receiver can implement a coherent QAM detection scheme for detecting an optical WDM channel signal modulated under one of the QAM constellations.

In one implementation, the digital signal processing unit in the optical transmitter 110 can provide a programmable modulation format that optimizes the data bit rate per wavelength (i.e. spectral efficiency) based on the optical transmission requirements and conditions of a given optical link. Referring back to FIG. 1A, the optical transmitter 110 is shown to transmit over one of the two different optical path links 121 and 122. Depending on which of the two optical path links 121 and 122, the signal modulation format and the associated data bit rate can be selected to enhance the performance of the signal transmission for the selected optical path link. Therefore, a single adjustable transmitter can be used to operate under different signal modulation formats with different data bit rates under different transmission conditions for the link. In some applications, for example, a network router in the network 120 can switch the optical WDM channel signal from the optical transmitter 110 from the first optical link 121 to a first optical receiver 130 to a second, different optical receiver 140 at another location via the optical link 122. Because the operating conditions of the two optical links 121 and 122 can be different, the optical transmitter 110 can be controlled to adjust the QAM constellation in its signal modulation to optimize the performance in transmitting data.

Consider a short optical transmission link that can tolerate a relatively high OSNR, a signal modulation format can be selected for the optical transmitter to transmit at a relatively high data rate per wavelength to achieve an acceptable data error rate at the optical receiver. For a long transmission link that can tolerate a lower OSNR, a different signal modulation format can be selected to transmit at a lower data rate to achieve an equivalent, acceptable error rate. In operation, the optical WDM signal from a particular optical transmitter can be routed to different destinations with different optical transmission lengths. The present adjustable bit rate optical transmission using programmable signal modulation can change the signal modulation format of the optical transmitter when the routing of the optical signal changes to optimize the transmission performance.

Notably, an optical transport network (OTN) that has many Dense Wavelength Division Multiplexed (DWDM) optical channels 910 and optical nodes with Reconfigurable Optical Add/Drop Multiplexers (ROADMs), different optical DWDM channels at different WDM wavelengths may be used to connect different destinations such as cities and thus may have different reach requirements. One way to deploy the optical DWDM transponders is to design the transponders with fixed signal modulation formats at fixed data bit rates to support the desired transmission performance for the longest routes. Under this design, the optical transponders are often over-engineered for optical transmission at shorter distances because the signal degradation effects on the WDM signals are less in such optical transmission and a data rate per wavelength higher than that for the long-distance transmission could have been used in the short-distance transmission to achieve the same or comparable data error rate. Another way to deploy the optical DWDM transponders is to deploy different optical transmitters optimized for different reach ranges or data bit rates at each optical transponder which selects a suitable optical transmitter based on the requirements of the optical transmission. This design can require device qualification, test, deployment, training and sparing of multiple different transponder card variants and may be undesirable for service providers.

The transmission condition of a particular optical path link in the optical system can be measured with various parameters. The optical signal to noise ratio of the optical transmission link can be used to represent the transmission condition and thus can used to select the proper M-QAM constellation for the signal modulation. The data bit error rate in the optical transmission link can also be used to represent the transmission condition and thus can be used to select the proper M-QAM constellation for the signal modulation. The data bit rate per wavelength or the spectral efficiency in the optical channel signal can also be used to represent the transmission condition and thus can be used to select the proper M-QAM constellation for the signal modulation. As yet another example, a least mean square error calculator can be implemented in the digital signal processor to calculate the least mean square value of the data bit error to represent the channel quality or fidelity and can be used to select the proper M-QAM constellation for the signal modulation. In addition, combinations of these different parameters can be used to select the proper M-QAM constellation for the signal modulation.

The present adjustable rate M-QAM programmable modulation transponders based on programmable signal modulation can be deployed in such an optical transport network to select the signal modulation format with a desired bit rate for each transponder to meet the specific reach requirement and OSNR of each DWDM channel. This adjustable bit rate optical transmission using programmable signal modulation at each optical transmitter can be used to maximize the spectral efficiency for each wavelength and maximize the capacity of the fiber optic cable. A single transponder card type can be used based on the present adjustable bit rate optical transmission using programmable signal modulation at each optical transponder and the associated sparing cost can thus be minimized by having only one card flavor per sparing depot. The baud rate of the channel can be kept constant and it's maximum limit can be set by the available optical bandwidth of each DWDM channel. Different levels of M-QAM can be provided to code a certain number of symbols per baud to maximize the data rate, keeping the spectral width of the signal constant, at the optimum maximum value. In some system implementations, a WDM signal may be required to propagate through at least 5 ROADM express filters, with typical cascaded optical filter FWHM bandwidth of 20 to 25 GHz. The present adjustable bit rate optical transmission using programmable signal modulation can be used to meet such and other requirements for each transmitter.

Figure 1C:
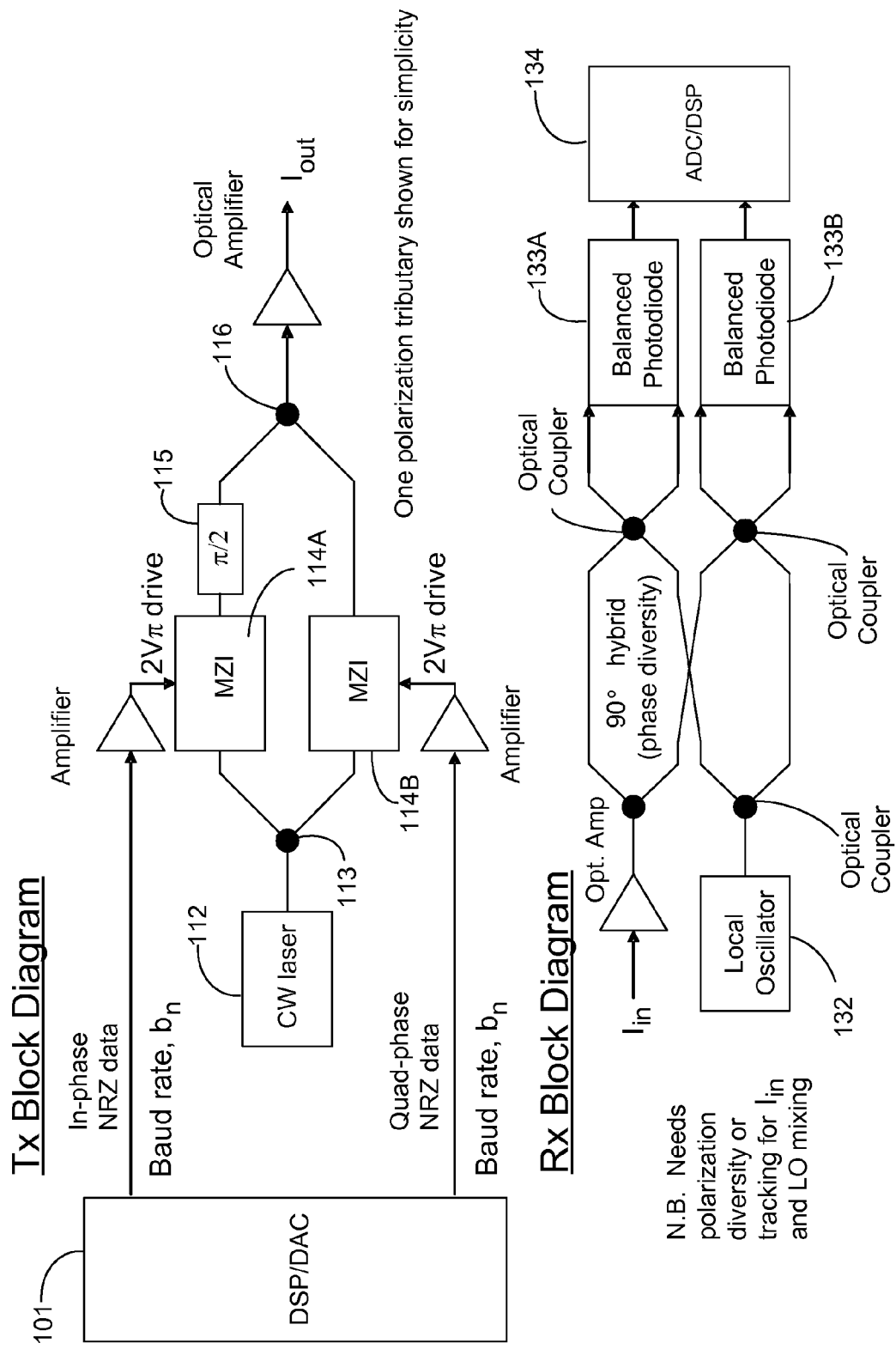
FIG. 1C illustrates an exemplary adjustable bit rate optical transmitter using programmable signal modulation and an exemplary optical receiver, respectively.

FIG. 1C illustrate an exemplary adjustable bit rate optical transmitter using programmable signal modulation and an exemplary optical receiver, respectively. This example shows the basic functional block diagrams for an optical coherent detection modulation scheme, with control of the amplitude of both in-phase, I and quadrature phase, Q, components of the modulated signal. The adjustable bit rate optical transmitter includes a digital signal processing (DSP) unit 101 and accompanying digital to analog conversion (DAC) circuitry to drive different programmable Mary-Quadrature Amplitude Modulation (M-QAM) schemes. The DSP 101 is programmed to apply a control algorithm to select a proper QAM scheme from the multiple QAM schemes for the signal modulation of the optical transmitter. In this particular example, the nominal baud rate, $b_n$, can be set as a constant and thus the optical transmission bandwidth for optical WDM signals under the different M-QAM constellations can remain essentially unchanged. Under this fixed baud rate configuration, the data bit rates and the data spectral efficiency can be increased without changing or modifying the optical network infrastructures. As such, an optical system can be upgraded to a system capable of higher bit data rates and higher data spectral efficiency by installing the present adjustable bit rate optical transmitters and respective optical receivers without changing the existing system fiber network infrastructures. In other implementations, the baud rates in the adjustable bit rate optical transmitter may also be adjustable to offer more continuous rate adaption rather than the discrete steps from moving between M-QAM symbol spaces.

In the exemplary adjustable bit rate optical transmitter in FIG. 1C, a CW laser 112 is used to produce a CW laser beam to an optical splitter 113 which splits the CW laser beam into two laser beams for carrying the I-phase modulation signal and the Q-phase modulation signal, respectively. A first optical Mach-Zehnder modulator 114A is used to modulate the first CW laser beam to carry the I-phase modulation signal based on a selected QAM constellation and a second optical Mach-Zehnder modulator 114B is used to modulate the second CW laser beam to carry the Q-phase modulation signal based on the selected QAM constellation. The modulated beams out of the two optical modulators 114A and 114B are phase shifted by $\pi/2$ (90 degrees) by a phase shifter 115 and are combined by an optical coupler 116 to form the output optical WDM channel for transmission.

The example in FIG. 1C uses only one optical polarization. Alternatively, two orthogonal optical polarizations can be utilized in a polarization multiplexing (PM) configuration to double the traffic carrying capacity by using a separate set of two quadrature modulators for each orthogonal polarization state and a polarization beam combiner to combine the two orthogonally polarized optical WDM channels at the same WDM wavelength to produce a PM output signal carrying two different channels. The two different optical transmitters may use generated the two optical channels with orthogonal polarizations from a common optical carrier source at the WDM wavelength. In one implementation, a phase adjustment is provided in the signal modulation to vary the Baud skew between the first and second channels with the orthogonal polarizations. Two different ways for setting the Baud skew may be used: (i) the Baud skew is set at the time of manufacturing (ii) the error rate information from the receiver is provided thru the feedback channel to adjust the Baud skew between the first and second channels. This Baud skew can be used to reduce nonlinear penalties in the transmission link.

FIG. 1C also shows an example of the optical receiver design for the optical transmitter. This optical receiver design implements a digital processing based synchronous coherent detection scheme that includes a free-running optical Local Oscillator (LO) 132 to produce an optical local oscillator signal, and feed forward carrier recovery, polarization demultiplexing, compensation for chromatic dispersion (CD) and polarization mode dispersion (PMD) by using two sets of balanced photodiodes 133A and 133B to produce two optical analog outputs, an analog to digital conversion (ADC) block to convert the signals into digital signals, and digital processing in a receiver DSP unit 134 by an adjustable digital Finite Impulse Response (FIR) filter. Alternatively, optical coherent QAM detection can also be achieved by using an optical local oscillator and an optical phase-lock loop (PLL) without using digital signal processing.

As an example for implementing the design in FIG. 1B, the baud rate may be set to a fixed value of 25 Gps. The value for a actual implementation baud rate may be set by including some overhead for PCS encoding, OTN framing and FEC. Two optical beams in two orthogonal optical polarizations can be modulated to carry two different data channels based on polarization multiplexing (PM).

Figure 2:
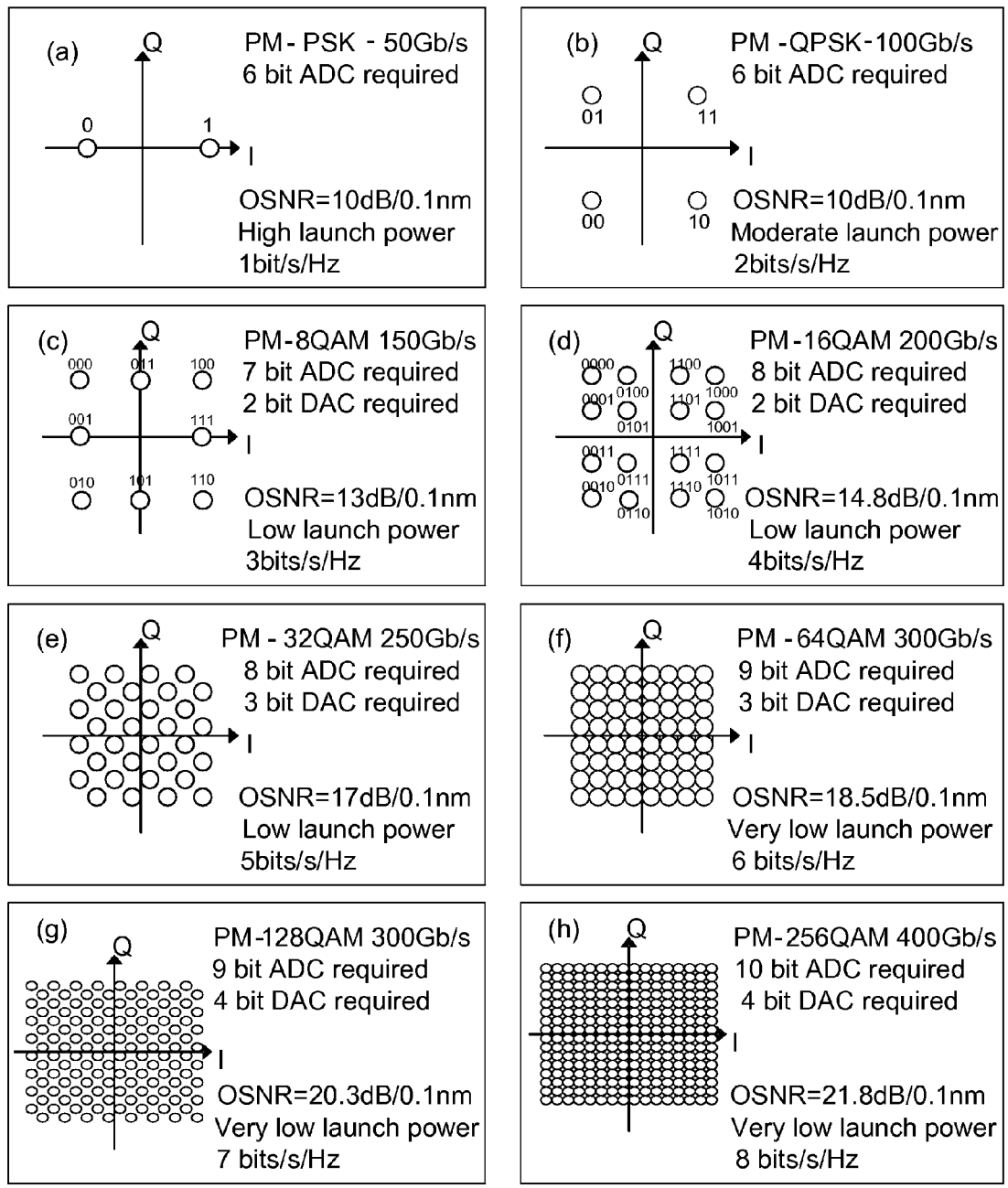
FIG. 2 shows examples of M-ary QAM constellations and representative OSNRs, DAC and ADC bit resolution requirements, bit rate and spectral efficiencies a baud rate of 25 Gb suitable for transmission through 50 GHz spaced reconfigurable optical add and drop modules (ROADMs) in dense WDM (DWDM) communication systems.

FIG. 2 shows examples of eight different QAM modulation constellations based on the Polarization Multiplexed Phase Shift Keying (PM-PSK) for the fixed baud rate of 25 Gps. Examples of ADC and DAC resolutions are shown for implementing the illustrated M-QAM. Other suitable ADC and DAC resolutions may be used. To maximize the reach of the optical WDM channel, the adjustable rate transponder can be configured to transmit PM-PSK as shown in FIG. 2(a). This modulation format can provide the maximum OSNR sensitivity and maximum launch power possible, therefore maximizing the distance that can be transmitted between signal 3R (reshape, retransmit and retime) regeneration points in the network. The capacity in this example would be 50 Gb/s (1 bits/s/Hz). If the specific channel has excess performance margin, the transponder can be reconfigured to PM-QPSK as shown in FIG. 2(b). The OSNR sensitivity is the same (I and Q component noise is independent) as in FIG. 2(a) and the launch power would be slightly lower than PM-PSK as it is more sensitive to nonlinear phase noise (90° between symbol states for QPSK, whereas 180° for PSK). This doubles the capacity to 100 Gb/s. In a similar fashion, if the channel has still more margin (i.e. typically if it operates over a shorter reach) the transponder can re-configure as PM-8QAM [FIG. 2(c)], PM-16QAM [FIG. 2(d)], PM-32QAM [FIG. 2(e)], PM-64QAM [FIG. 2(f)], PM-128QAM [FIG. 2(g)], PM-256QAM [FIG. 2(h)], etc.

As illustrated by the constellation diagrams in FIG. 2, each time the M-QAM bits/symbol rate is incremented, the channel carrying capacity increases, at the expense of an increase in the required OSNR. The OSNR increase is due to the reduction in the Euclidean distance from symbol to symbol. Rectangular QAM constellations are used in this analysis for implementation simplicity and circular QAM constellations can also be used to increase the minimum Euclidean distance between adjacent symbols.

Figure 3:
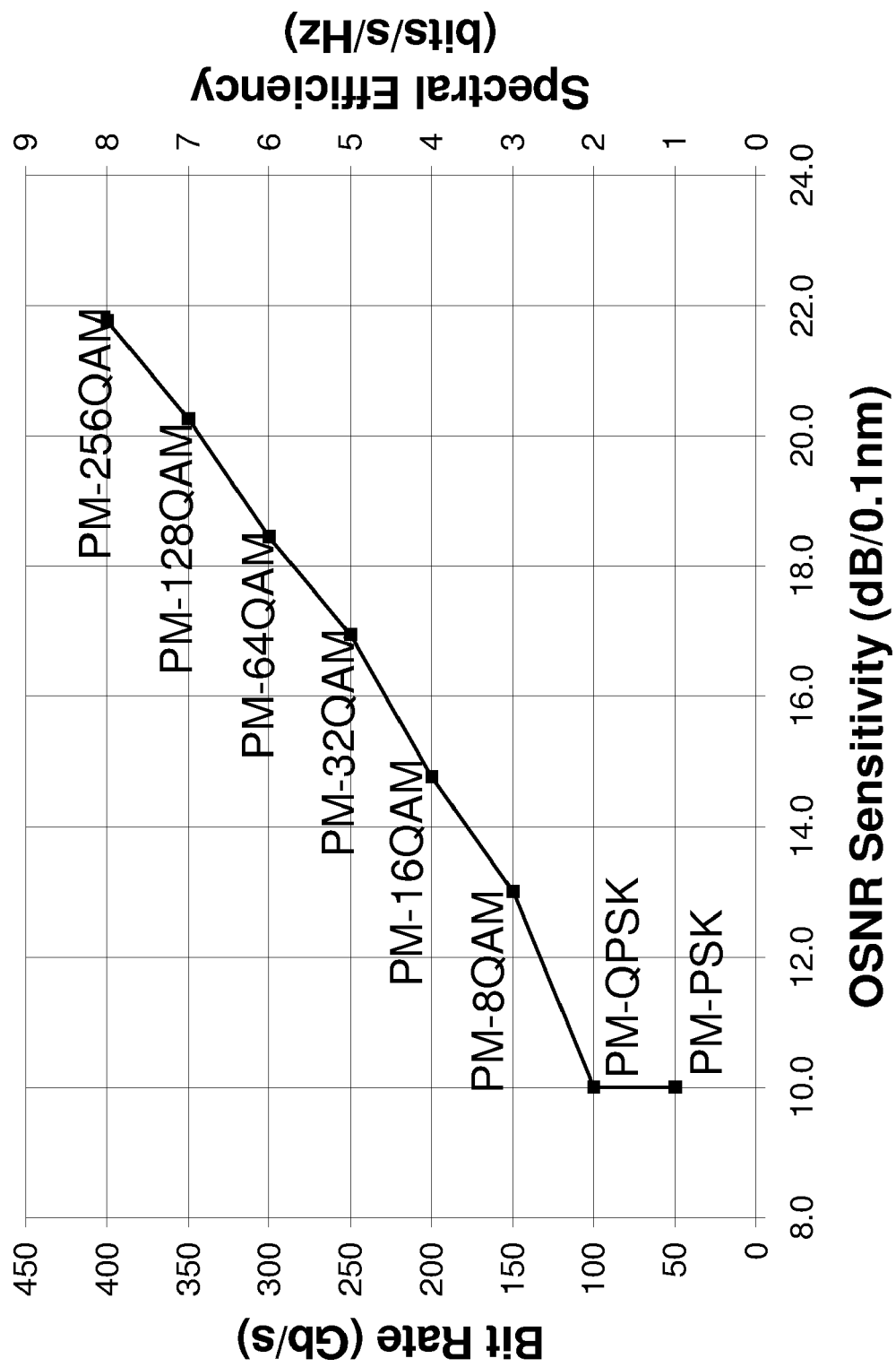
FIG. 3 shows M-QAM bit rate vs. OSNR tradeoff.

FIG. 3 illustrates the tradeoff for channel bit rate capacity/spectral efficiency versus OSNR for the different PM-QAM modulation formats.

Figure 4:
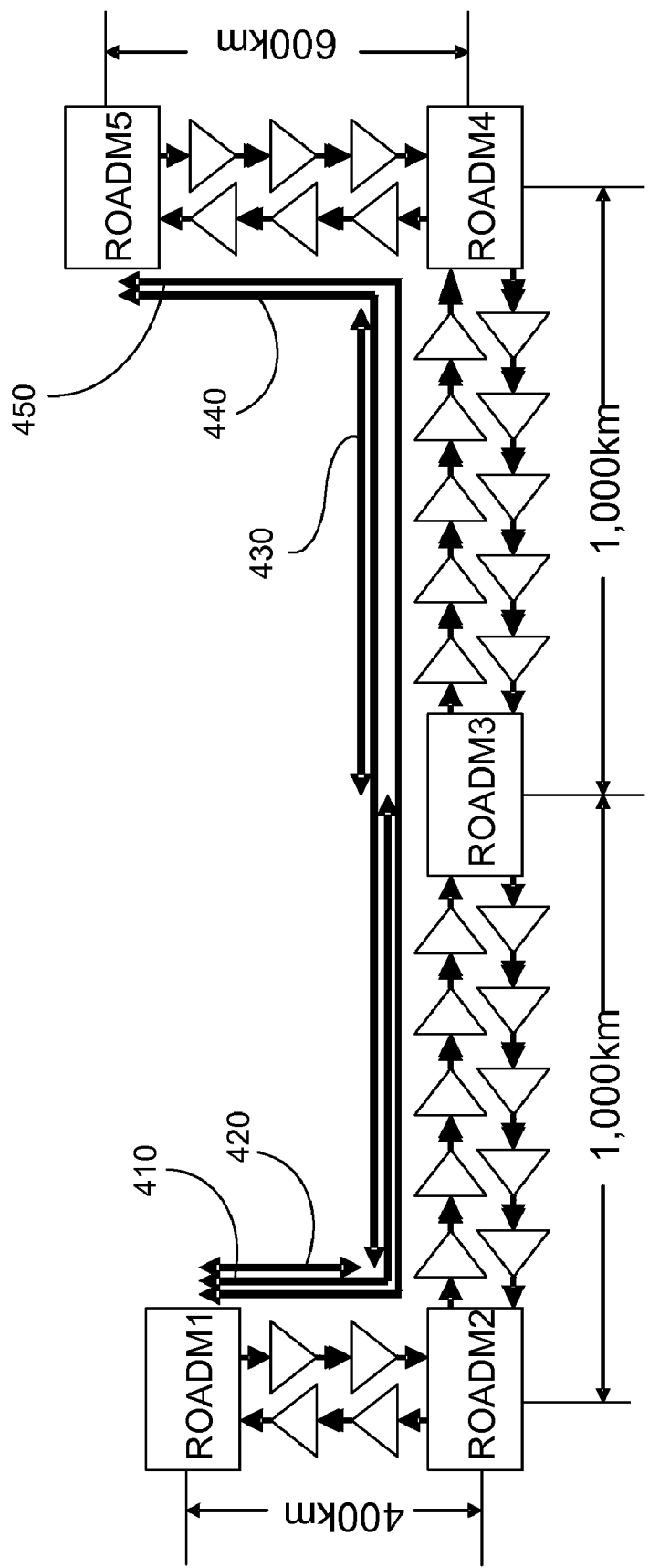
FIG. 4 shows a networking example for the M-QAM optimization per wavelength channel. The link path 410 between ROADM1 and ROADM3 has a reach of 1,400 km and is based on a PM-16QAM modulation with a capacity of 200 Gb/s. The link path 420 between ROADM1 and ROADM2 has a reach of 400 km and is based on a PM-64QAM modulation with a capacity of 300 Gb/s. The link path 430 between ROADM3 and ROADM4 has a reach of 1,000 km and is based on a PM-32QAM modulation with a capacity of 250 Gb/s. The link path 440 between ROADM2 and ROADM5 has a reach of 2,600 km and is based on a PM-8QAM modulation with a capacity of 150 Gb/s. The link path 450 between ROADM1 and ROADM5 has a reach of 3,000 km and is based on a PM-QPSK modulation with a capacity of 100 Gb/s.

FIG. 4 shows another example of how programmable M-QAM adjustable rate transponders may work in an actual DWDM system with ROADMs at each traffic add/drop terminal. This example shows that shorter links would typically allow higher capacity by using higher number of levels for the M-QAM constellations and that longer optical path circuits transmit less capacity by using QAM constellations with lower number of levels, DQPSK or PSK transmission to maximize the reach distance. Other tradeoffs are also possible with this approach. For example, on high capacity routes, reduced distance between EDFAs or Raman amplification used to boost OSNR, which could then be traded for increased capacity by using a higher level QAM constellations selected from the available QAM constellations in the digital processing unit for the transmitter. Another degree of freedom is that the use of 3R regenerators could be used to limit, or reduce, the optical reach on certain wavelengths or geographic sections of the network so that higher order M-QAM modulation could be utilized to increase the wavelength channel's transmission rate capacity, or spectral efficiency. In the example in FIG. 4, the optical transmitters for different optical path links can use the same rate adjustable optical transmitters described in this application that are set to operate at different M-QAM constellations with different data bit rates for different communication distances.

Figure 5:
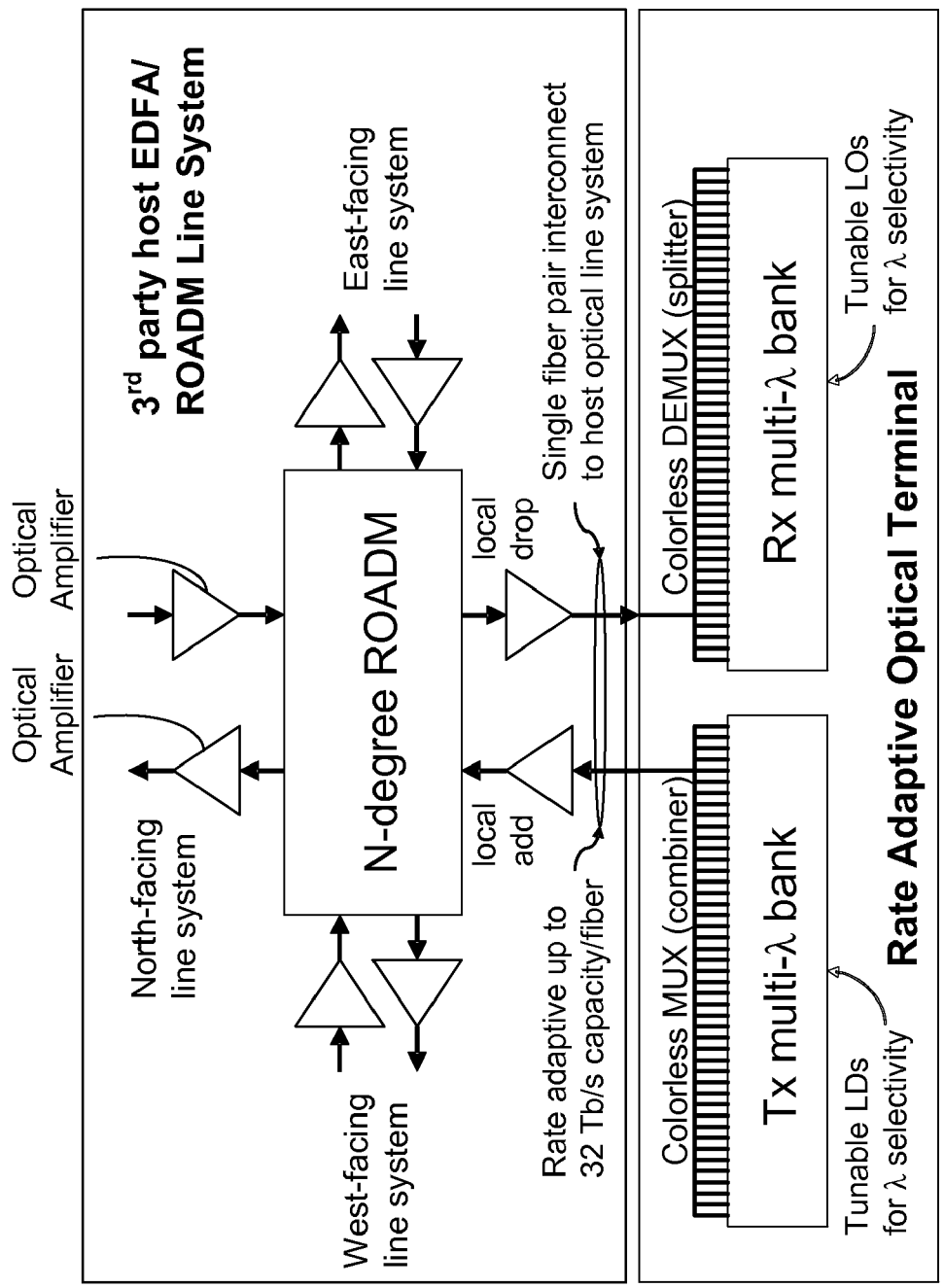
FIG. 5 shows an example of rate adjustable optical terminal in an optical network having ROADMs and EDFAs.

In deployment of the present adjustable bit rat optical transmitters, a bank of rate adjustable M-QAM transponders could be used in a complete optical terminal sub-system to maximize the channel data rate on a per wavelength basis. FIG. 5 shows one example of a rate adjustable optical transponder that is connected to an ROADM within an optical node in a network. This rate adjustable optical transponder includes a bank of programmable rate adjustable optical transmitters at different tunable optical WDM wavelengths based on tunable laser diodes and a bank of optical receivers with tunable optical local oscillators (LOs) for wavelength selectivity in detection. The design in the example in FIG. 5 can be used to maximize the total fiber capacity, by adapting the bit rate each wavelength channel (typically 80 independent channels on commercial DWDM systems), dependent on the channel distance and instantaneous performance of each channel path, using pre-FEC BER feedback to adapt the M-QAM constellation on a real-time basis. One embodiment could be that this optical terminal resides within an Internet Protocol (IP) router, where IP packets can be efficiently statistically multiplexed into the bank of rate adjustable DWDM transponders, maximizing IP data throughput. Notably, the rate adjustable optical transponder in FIG. 5 can be connected to the third party ROADM system without modifying the ROADM and other aspects of the system. This feature reduces cost and labor in upgrading the system.

In implementing the present adjustable bit rate optical transmission using programmable signal modulation, various mechanisms can be used to select a suitable modulation format with a suitable data bit rate for a given optical transmitter. In one implementation, for example, design rules form optical link engineering tools can be used to determine a priori what M-QAM signal constellation be programmed for each specific transmission route and a look-up table for the transmission routs and the modulation formats is generated and stored in the control for the optical transmitter. In operation, the routing information is used to select the proper modulation format from the look-up table to control the modulation. When the routing is changed for the optical WDM channel of that optical transmitter, a different modulation format is selected from the look-up table for the optical transmitter.

Figure 6:
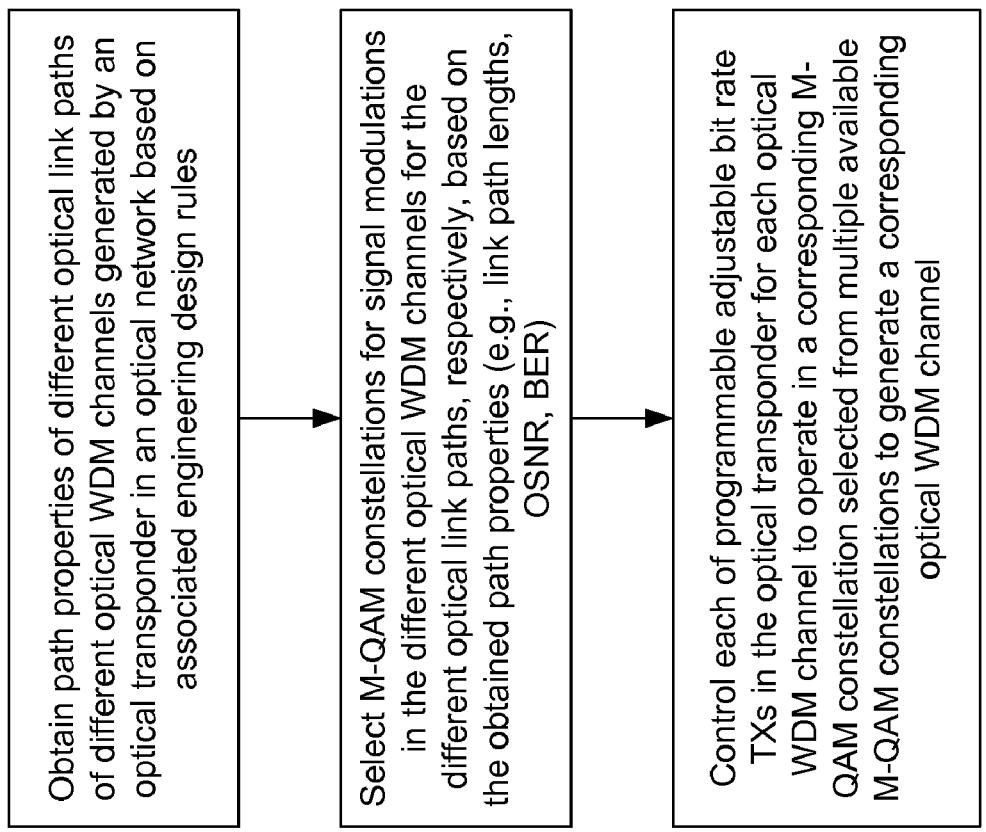
FIGS. 6, 7 and 8 illustrate examples of three different modes of operating the present adjustable bit rate optical transmission using programmable signal modulation.

FIG. 6 illustrates one example of this process. First, the optical path properties of different optical link paths of different optical WDM channels generated by a programmable rate adjustable optical transponder in an optical network are obtained based on associated engineering design rules used in designing these optical link paths. Next, appropriate M-QAM constellations for signal modulations in the different optical WDM channels are selected for the different optical link paths, respectively, based on the obtained path properties (e.g., link path lengths, OSNR, BER). This mapping between the appropriate M-QAM constellations for signal modulations and the optical link paths is used to form the look-up table. In operation of the system, this look-up table is used to control each of programmable adjustable bit rate transmitters in the optical transponder for each optical WDM channel to operate in a corresponding M-QAM constellation selected from multiple available M-QAM constellations to generate a corresponding optical WDM channel.

Figure 7:
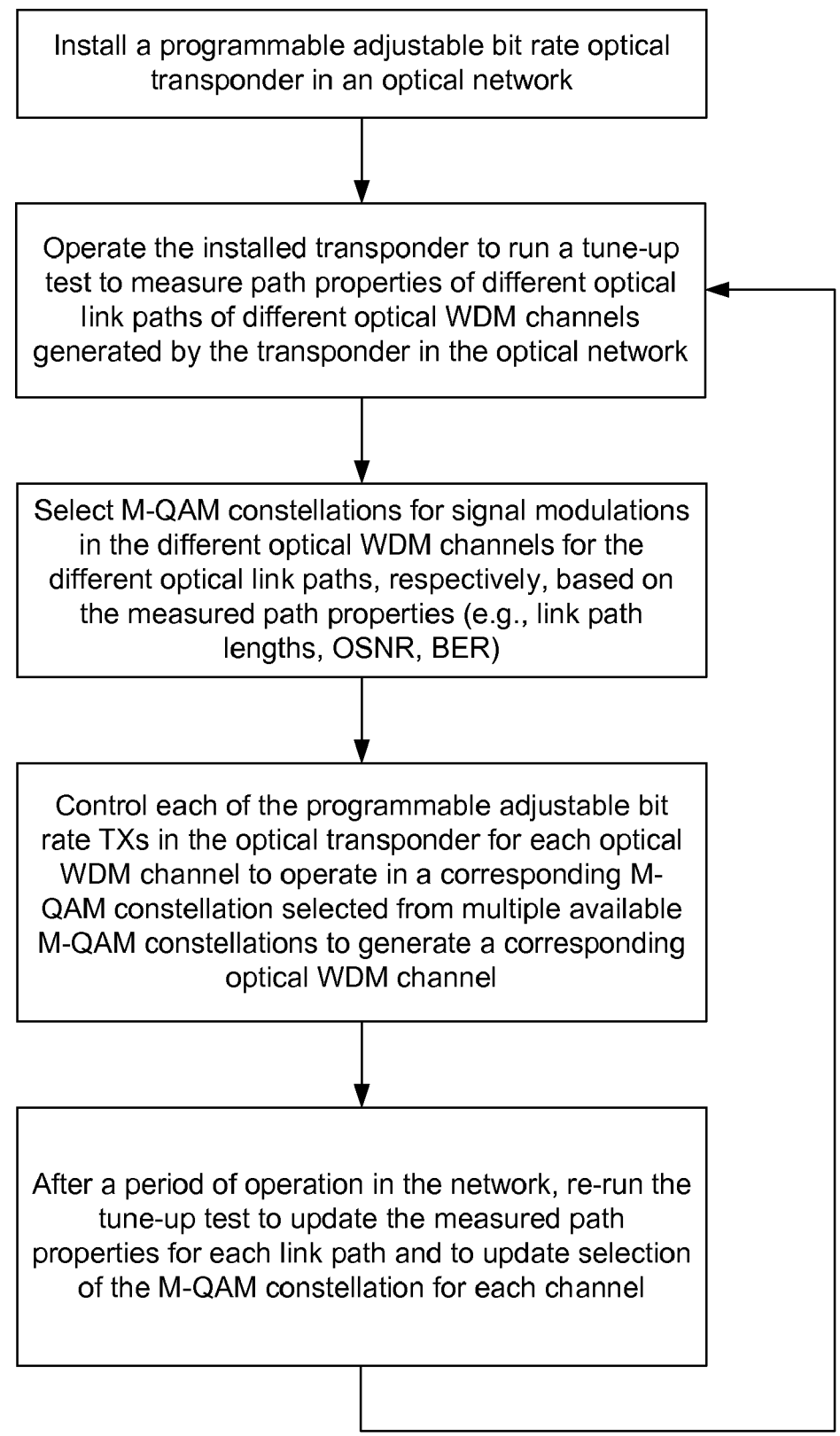

In another implementation of the adjustable bit rate optical transmission using programmable signal modulation, the adjustable rate transponders can be deployed in the field, then go through a self-training "set and forget" procedure at channel turn-up that determines the maximum usable capacity. This implementation can use the pre-FEC BER (Q margin to FEC threshold) as a feedback figure of merit to determine the maximum transmission rate, with an adequate margin for known performance fading in the channel. FIG. 7 illustrates one example for this procedure. First, one or more programmable adjustable bit rate optical transponders are installed in an optical network. The installed transponder is operated to run a tune-up test to measure path properties of different optical link paths of different optical WDM channels generated by the transponder in the optical network. Respective M-QAM constellations for signal modulations in the different optical WDM channels are then selected for the different optical link paths, respectively, based on the measured path properties (e.g., link path lengths, OSNR, and BER). Each of the programmable adjustable bit rate transmitters in the optical transponder for each optical WDM channel is controlled to operate in a corresponding M-QAM constellation selected from multiple available M-QAM constellations to generate a corresponding optical WDM channel. In practical implementations, the transmission condition of an optical WDM channel signal can change over time and thus a selected QAM constellation may become unsuited at a later time. Hence, after a period of operation in the network, the tune-up test may be performed again to update the measured path properties for each link path and to update the selection of the M-QAM constellation for each channel.

In yet another implementation, a dynamic feedback mechanism is provided to inform an adjustable bit rate optical transmitter of the current optical transmission requirement or condition of the link so that the bit rate adapts over time continuously to the instantaneous performance of the link. This feedback provides a rate adaptive use of the rate adjustable transmitters.

Figure 8:
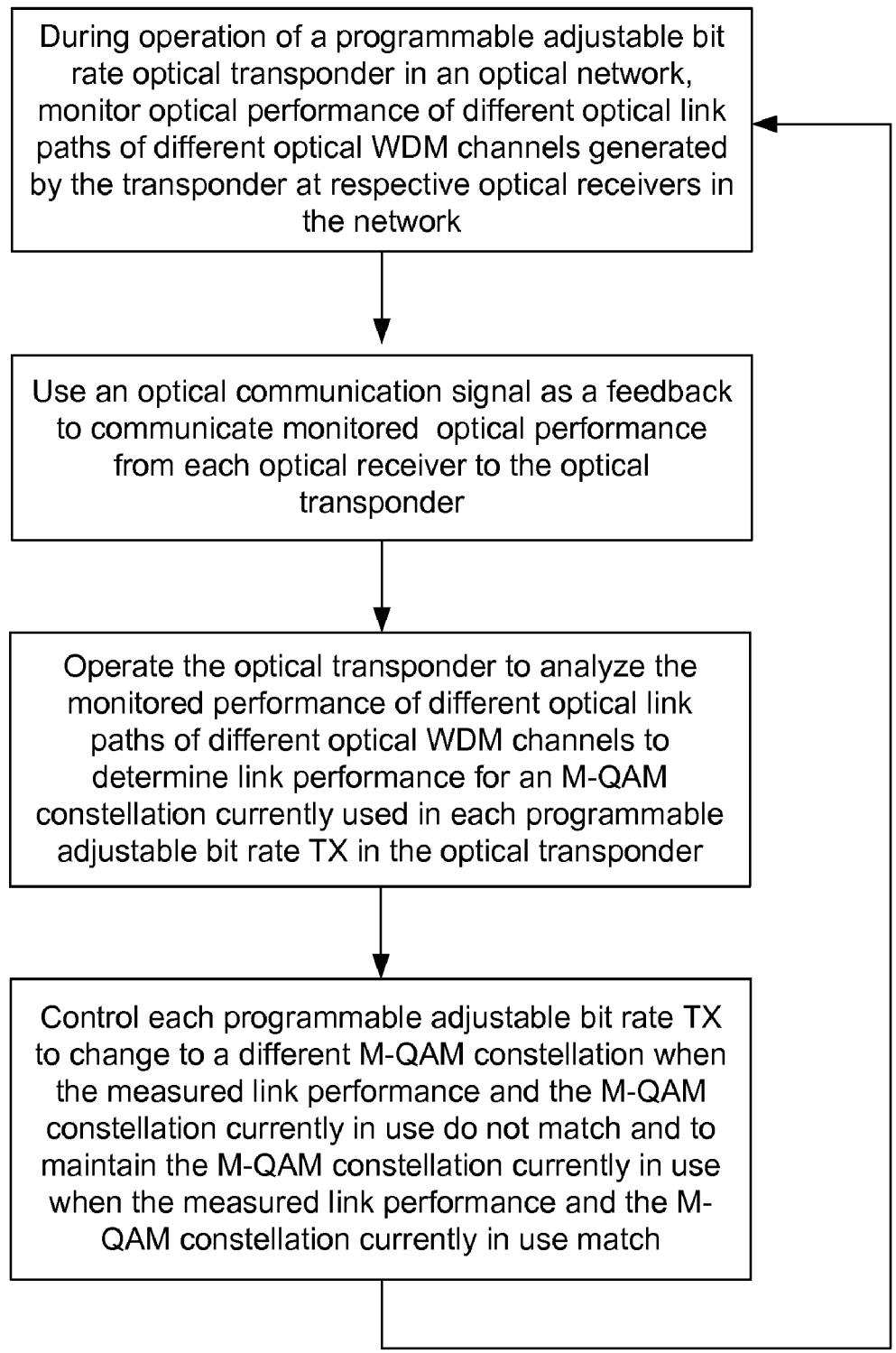

FIG. 8 shows an example of this feedback control process in adjusting a programmable adjustable bit rate optical transmitter. During operation of a programmable adjustable bit rate optical transponder, the optical performance of different optical link paths of different optical WDM channels generated by the transponder at respective optical receivers in the network is monitored. This monitoring can be achieved at an optical receiver, for example. An optical communication signal can be used as a feedback to communicate monitored optical performance from each optical receiver to the optical transponder. The optical transponder is operated to analyze the monitored performance of different optical link paths of different optical WDM channels to determine link performance for an M-QAM constellation currently used in each programmable adjustable bit rate transmitter. Based on the link performance, the programmable adjustable bit rate transmitter is controlled to change to a different M-QAM constellation when the measured link performance and the M-QAM constellation currently in use do not match. When the measured link performance and the M-QAM constellation currently in use match, the programmable adjustable bit rate transmitter is controlled to maintain the M-QAM constellation currently in use. This feedback and control can be implemented in real time during the normal operation where the above processing steps are repeated.

In one implementation, the pre-FEC BER thresholding may be used as a feedback mechanism to control the selection of a M-QAM constellation for the signal modulation, and hence the bit rate associated with the selected M-QAM constellation. This implementation can dynamically maximize the transmission capacity of the optical fiber on a per channel basis. This design can improve the performance of DWDM channels in various existing systems where many channels are operated below their performance full capacity, either through conservative design and/or operation over shorter links.

Figure 9:
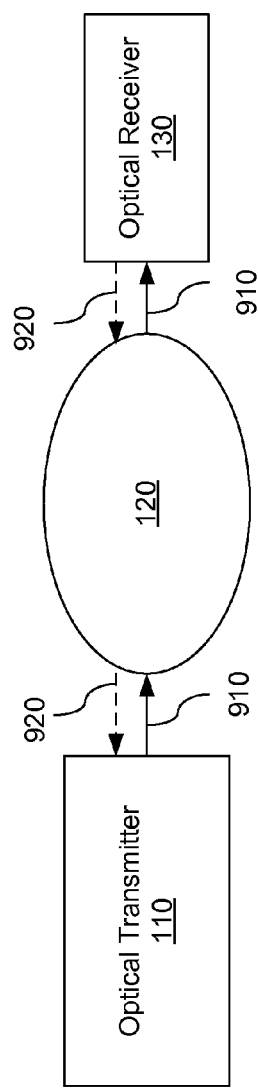
FIG. 9 shows an example of an optical system based on adaptive bit rate optical transmission 110 using programmable signal modulation and dynamic feedback.

FIG. 9 shows an example of an optical communication system based on the adaptive bit rate optical transmission 110 using programmable signal modulation and dynamic feedback. A feedback signal, e.g., an optical feedback signal 920, is generated at an optical receiver 130 in a destination optical transponder and is directed back to the optical transmitter to control the signal modulation format for the optical transmitter. Various performance monitoring mechanisms can be used as a feedback mechanism to control (and maximize) the bit rate. The performance feedback signal can be communicated from the receiver (tail-end) to the transmitter (head-end) where the bit rate (and M-QAM constellation) will be selected to maximize bit rate, without causing any post FEC errors (error-free transmission).

As an example, the OSNR value can be one receiver performance monitor parameter for feedback. One limitation with using OSNR is that it only loosely correlates with the actual link performance and it does not include any eye distortion effects (such CD, PMD, SPM) that also impacts the transmission performance. Various commercial core optical networking equipment uses forward error correction (FEC) encoding to improve the reach performance and this parameter can be used for the feedback to control the present adjustable bit rate optical transmitter. A useful benefit of FEC is that the pre-FEC BER can also be monitored. From knowledge of the FEC coding gain (determined by the specific algorithm chosen) the system margin (typically given in dBQ) can be easily derived. The optimum M-QAM constellation, and hence transmitted bit rate, can yield a margin value that is high enough not to cause any post-FEC output bit errors due to fast transient effects (that the adjustable bit rate transponder will not be fast enough to track) but not so large that the transponder is transmitting at too low a bit rate and not maximizing throughput performance. Transport networks, such as SONET and OTN, offer in-band communications channels that can be used to send supervisory data, typically in the overhead bytes of the signal frame.

Figure 10:
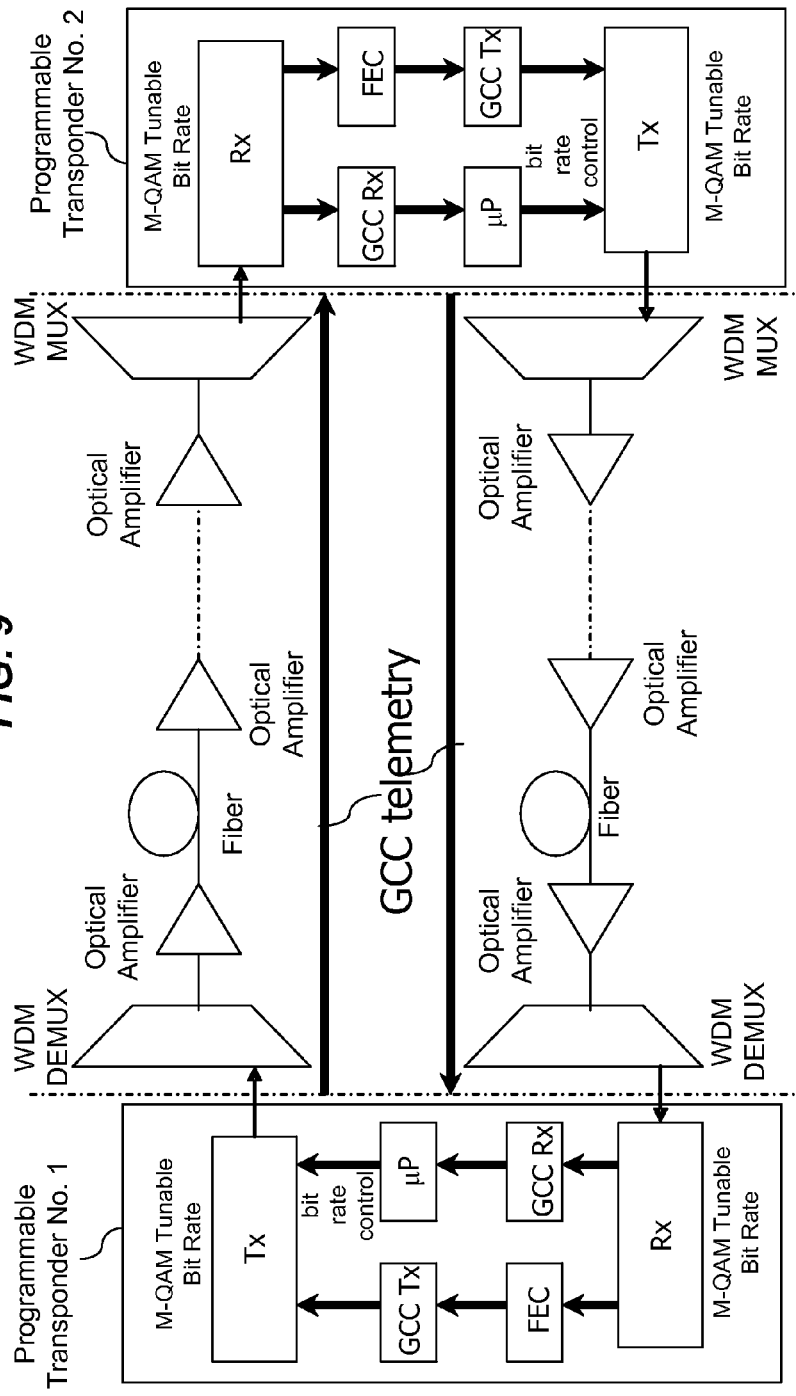
FIG. 10 shows an example of the system in FIG. 9 for control of adaptive bite rate transponder using pre-FEC BER data from receiver communicated via "in-band" General Communications Channel (GCC) to transmitter to set optimum bit rate.

FIG. 10 shows an implementation of the feedback in FIG. 9 where the General Communication Channel (GCC) optical signal under ITU Standard G.709 for OTN systems is used to send the pre-FEC BER feedback signal from the tail-end optical transponder to the head-end optical transponder via the datapath in the opposite direction of the transmitted optical WDM channel. As illustrated, the GCC transmitter in the head-end optical transponder operates the GCC transmitter to modulate the received FEC information from the receiver RX onto the GCC signal to the M-QAM tunable bit rate transmitter. The head-end transponder then terminates the GCC and, based on the pre-FEC BER data, determines the optimum M-QAM constellation with a respective bit rate to be used for the M-QAM tunable bit rate optical transmitter. The selected M-QAM constellation is then used to control the signal modulation in the M-QAM tunable bit rate optical transmitter. Other optical signals can also be used for the optical feedback 920 in selecting and controlling the QAM constellations.

Figure 11:
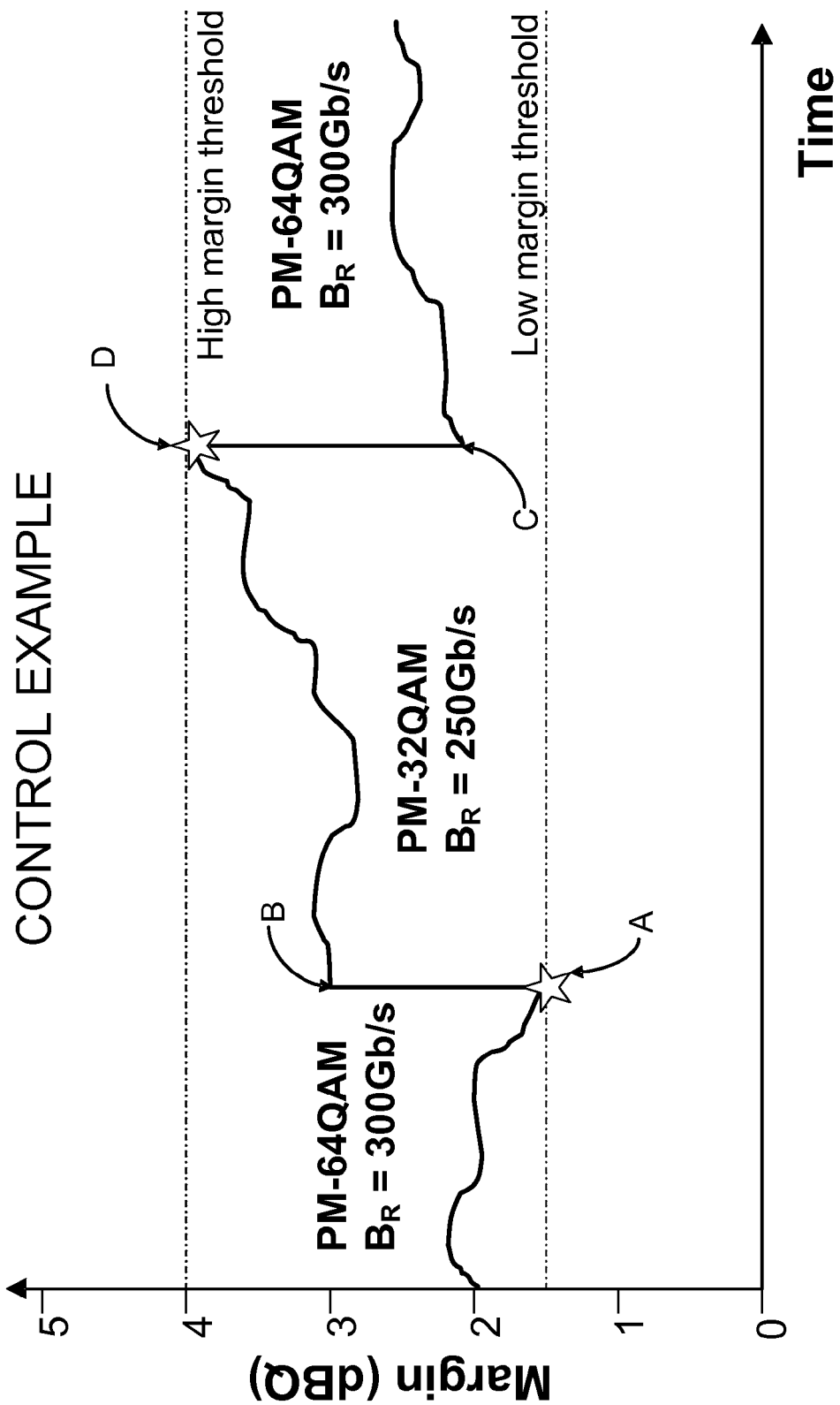
FIG. 11 shows an example for monitoring of system margin (derived from pre-FEC BER) used to set optimum M-QAM constellation in the system in FIG. 10. Points A-D represent four different points. At point A, a low margin threshold is crossed, and the number of levels in the QAM constellation is decreased. At point B, the performance margin increases as the number of levels in the QAM constellation is decreased. At point C, the performance margin decreases as the number of levels in the QAM constellation is increased. At point D, a high margin threshold is crossed and the number of levels in the QAM constellation is increased.

As an example, FIG. 11 shows how HIGH and LOW thresholds on the instantaneous margin derived from the Rx end pre-FEC BER data can be used to send interrupt signals to either increase or decrease the M-QAM constellation for an optical transmitter, respectively, to maximize the bit rate throughput. A pre-determined LOW threshold can be set and thus a trigger can be sent if the margin drops below the threshold. The trigger could then cause an interrupt signal which could either directly reduce the data rate (and M-QAM constellation) or more likely it would send a signal to the controller of the data flow (e.g. flow control mechanism in an IP router, or bandwidth aggregation control in a crossconnect switch). The flow controller could then take the appropriate action (e.g. re-route some traffic by a different path or wavelength) so that when the bit rate is throttled back, there is no impact to the end user communication. Some buffering may also be needed during the time period over which the channel re-adjusts to the new M-QAM constellation and synchs up, at both transmit and receive ends. When the margin exceeds some specified HIGH threshold, then effectively this channel is under-utilized and the bit rate (M-QAM constellation) can be increased to take advantage of this improved link performance and maximize bit rate. Again, crossing this threshold could instantaneously trigger the bit rate increase, but it may be more useful to send an interrupt signal to the bandwidth flow controller to say that we can increase the bit rate of the channel and allow it to take any necessary action (buffering, re-route traffic flows, etc.) before the bit rate increase occurs on the line.

Various features described in this application can be used to operate a single adjustable bit rate transponder to modify its bit rate via changing the M-QAM constellation transmission to maximize the achievable data throughput on any particular wavelength channel in a DWDM system. The actual channel performance depends various factors including the reach (OSNR) and the accumulated signal distortions from fiber linear effects (such as CD, PMD and PDL) and nonlinear optical effects such as self phase modulation (SPM), inter-bit four wave mixing (IFWM), cross phase modulation (XPM), and four wave mixing (FWM), many of which cause temporal variation, or fading in the channel. By assuming a maximum baud rate that is selected to ensure propagation through the host DWDM system optical filters (e.g. 25 Gbaud rate ensures transmission through multiple cascaded 50 GHz ROADMs) then increasing the bit rate of the adjustable transponder without changing the baud rate (or optical spectral width, to the first order) means that the signal will still propagate through the DWDM filters, with no changes required to the installed base of DWDM equipment.

Different optical transmitters at different WDM wavelengths traversing different distances in a system can be operated to adjust their respective levels in the M-QAM constellation to trade the spectral efficiency for reach. Short reach demands can be served with a M-QAM constellation with a relatively high bit rate, whereas longer circuits will optimize for reach and have a subsequently lower bit rate. As only one single flavor of adjustable rate transponder is needed, there is not a high penalty associated with sparing compared to the case when you have multiple different fixed rate transponders with different reach capabilities, in which case each sparing depot must store one of each type of transponder. The cost of the adjustable rate transponder design is dominated by the electro-optics and the cost structure for the adjustable design would be approximately the same as a fixed transponder supporting PM-QPSK. This means that increasing the data rate for shorter reach circuits comes at a very low cost premium (need a DAC at the transmit end and higher resolution ADC at the receiver), which is attractive to service providers.

The present adjustable bit rate optical transmission using programmable signal modulation can also be implemented to achieve considerable space and power advantages. When the transponder transmits at a higher date rate, the power consumption and transponder footprint do not change, so this realizes considerable operational expense (OPEX) savings to the service provider and reduces the carbon footprint of the service provider backbone optical transport network, with positive environmental impact.

The present adjustable bit rate optical transmission 110 using programmable signal modulation can be used to provide continuous, adaptive bit rate control so that the channel can be maintained at its the maximum data carrying capacity at any point in time. As many distortion effects are temporally varying (such as PMD, PDL, XPM and FWM) the performance margin will also fluctuate. Various other optical systems with fixed rate transponders design can use an added margin to cope with worst-case values for each of these effects. In such fixed rate systems, at any typical point in time, the channel normally has excess performance margin as these effects are not at worst-case values at that particular point in time. The present adaptive bit rate optical transmission 110 using programmable signal modulation can be implemented to allow the channel to adapt and maximize the bit rate in real time, depending on the value of instantaneous temporal distortions that are subject to fading phenomena. Adjustable bit rate transmission provides additional value in the network by increasing the average bit rate transmitted over time in the optical transport network. It also reduces the risk that too many fixed rate transponders or regenerators have been deployed in a network by overly conservative link engineering assumptions.

For longer reach demands, it is envisaged that typically a low M-QAM constellation (possibly [PM]-QPSK for maximum reach) will be selected by the adjustable rate transponder. However, if the carrier values spectral efficiency (for example if they have a low # optical fibers available, or want to maximize capacity on an existing DWDM system) the service provider has the option of deploying rate adjustable regenerators along the link. This reduces the required OSNR sensitivity and hence should allow transmission of a higher data rate from the adjustable rate transponder and regen(s) on the link. The tradeoff is higher spectral efficiency (more capacity per fiber) vs. regenerator(s) cost. If a regenerator(s) is/are used in the link, then the whole end-to-end link will have the bit rate limited to the lowest margin OEO section. As such, communication will be needed between the regens and end terminal transponders to make sure that the adjustable bit rate is the same for all sections and dictated by the lowest margin OEO section. Again, margin measurement using pre-FEC BER monitoring and in-band communications channel (such as the GCC) can be used for this purpose and control.

While this specification contains many specifics, these should not be construed as limitations on the scope of an invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or a variation of a subcombination.

Only a few implementations are disclosed. However, it is understood that variations and enhancements may be made.

What is claimed is:

1. A method for optical communications, the method comprising:
    operating a programmable optical transmitter to provide a plurality of different quadrature amplitude modulation (QAM) constellations with different data bit rates in controlling signal modulation of an optical channel signal with a variable data bit rate selected from the QAM constellations;
    operating the optical transmitter to select one of the QAM constellations to control the signal modulation based on a condition of an optical transmission link that transmits the optical channel signal; and
    operating the optical transmitter to select another one of the QAM constellations to control the signal modulation when the condition of the optical transmission link changes,
    wherein after a period of time in operating the optical transmitter under the selected QAM constellation, the method comprises
    operating the optical transmitter to perform another test to measure performance of the optical transmission link;
    using measured performance of the optical link to determine whether the selected QAM constellation currently in use for the signal modulation in the optical transmitter is adequate; and
    operating the optical transmitter to select a different QAM constellation in transmitting the optical channel signal over the optical transmission link when the previously selected QAM constellation currently in use for the signal modulation is not adequate based on the measured performance.

2. The method as in claim 1, wherein:
    the change of the condition of the optical transmission link includes a distance of the optical transmission link.

3. The method as in claim 2, comprising:
    operating the optical transmitter to change the QAM constellation for signal modulation to a lower order QAM constellation with a lower data bit rate when a length of the optical transmission link increases.

4. The method as in claim 1, wherein:
    the change of the condition of the optical transmission link includes an optical signal to noise ratio of the optical transmission link.

5. The method as in claim 1, wherein:
    the change of the condition of the optical transmission link includes a data bit error rate in the optical transmission link.

6. The method as in claim 1, wherein:
    the change of the condition of the optical transmission link includes a data bit rate per wavelength in the optical channel signal.

7. The method as in claim 1, comprising:
    using a least mean square value of a data bit error rate in the optical transmission link to indicate the change of the condition of the optical transmission link.

8. The method as in claim 1, wherein:
    the QAM constellations include circular QAM constellations.

9. The method as in claim 1, wherein:
    the QAM constellations include square QAM constellations.

10. The method as in claim 1, comprising:
    providing a pre-determined look-up table for the QAM constellations and operating conditions of the optical transmission link for transmitting the optical channel signal; and using a given operating condition of the optical transmission link to select a QAM constellation for the signal modulation in the optical transmitter from the pre-determined look-up table.

11. The method as in claim 1, comprising:
during operation of the optical transmitter in transmitting the optical channel signal over the optical transmission link, monitoring the condition of the optical transmission link;
using a feedback signal to communicate the monitored condition to the optical transmitter; and
operating the optical transmitter to select a QAM constellation for the signal modulation in the optical transmitter in response to the feedback signal.

12. The method as in claim 1, wherein:
the different QAM constellations with different data bit rates in the programmable optical transmitter have a fixed baud rate.

13. The method as in claim 1, comprising:
changing a baud rate when changing from a first of the different QAM constellations with different data bit rates in the programmable optical transmitter to a second of the different QAM constellations.

14. The method as in claim 1, comprising:
operating a coherent QAM detection optical receiver to receive the optical channel signal from the optical transmission link and to extract data from the received optical channel signal.

15. The method as in claim 14, wherein:
the coherent QAM detection optical receiver includes a local optical oscillator that produces an optical signal to mix with the received optical channel signal in extracting data from the received optical channel signal.

16. The method as in claim 14, wherein:
the coherent QAM detection optical receiver includes a digital signal processor that performs a digital coherent QAM processing operation in extracting data from the received optical channel signal.

17. A method for optical communications, the method comprising:
operating a programmable optical transmitter to provide a plurality of different quadrature amplitude modulation (QAM) constellations with different data bit rates in controlling signal modulation of an optical channel signal with a variable data bit rate selected from the QAM constellations;
operating the optical transmitter to select one of the QAM constellations to control the signal modulation based on a condition of an optical transmission link that transmits the optical channel signal; and
operating the optical transmitter to select another one of the QAM constellations to control the signal modulation when the condition of the optical transmission link changes,
wherein prior to operating the optical transmitter in transmitting the optical channel signal over the optical transmission link, the method comprises:
operating the optical transmitter to perform a test to measure performance of the optical transmission link;
using measured performance of the optical link to select a QAM constellation for the signal modulation in the optical transmitter; and
operating the optical transmitter under the selected QAM constellation in transmitting the optical channel signal over the optical transmission link.

18. The method as in claim 17, comprising:
after a period of time in operating the optical transmitter under the selected QAM constellation, operating the optical transmitter to perform another test to measure performance of the optical transmission link;
using measured performance of the optical link to determine whether the selected QAM constellation currently in use for the signal modulation in the optical transmitter is adequate; and
operating the optical transmitter to select a different QAM constellation in transmitting the optical channel signal over the optical transmission link when the previously selected QAM constellation currently in use for the signal modulation is not adequate based on the measured performance.

19. A system for optical communications, the system comprising wherein:
an optical transponder including:
a plurality of programmable optical transmitters to produce optical WDM channel signals at different optical WDM wavelengths, each programmable optical transmitter of the plurality of the programmable optical transmitters comprising a digital signal processing unit that is programmed to include a plurality of different quadrature amplitude modulation (QAM) constellations with different data bit rates in controlling signal modulation of an optical WDM channel signal with a variable data bit rate selected from the QAM constellations, wherein the optical WDM channel signal at the WDM channel wavelength from the programmable optical transmitter is in a first optical polarization;
a second programmable optical transmitter that produces a second optical WDM channel signal at the WDM channel wavelength in a second optical polarization that is orthogonal to the first optical polarization, and
a polarization combiner that combines the optical WDM channel signal in the first optical polarization and the second optical WDM channel signal in the second optical polarization to produce a polarization multiplexed signal for transmission to an optical transmission network connected to optical transponder to transmit the optical WDM channel signals;
at least one optical receiver in the optical transmission network to receive at least one of the optical WDM channel signals from the optical transponder and to include a coherent QAM detection mechanism to extract data from the received optical WDM channel signal; and
a feedback mechanism in the optical transmission network to communicate to the optical transponder a feedback signal indicative of a condition of an optical transmission link that transmits the at least one optical WDM channel signal form the optical transponder to the optical receiver,
wherein the optical transponder responds to the feedback signal to select one QAM constellation from the QAM constellations to control the signal modulation in a respective programmable optical transmitter based on the feedback signal and selects another QAM constellation to control the signal modulation in the respective programmable optical transmitter when the condition of the optical transmission link changes.

20. A method for optical communications, the method comprising:
connecting a programmable optical transponder in an optical communication network, each programmable optical transponder comprising a plurality of programmable optical transmitters to produce optical WDM channel signals at different optical WDM wavelengths and a plurality of optical receivers for detecting optical WDM channel signals, each programmable optical transmitter comprising a digital signal processing unit that is programmed to include a plurality of different quadrature amplitude modulation (QAM) constellations with different data bit rates in controlling signal modulation of an optical WDM channel signal with a variable data bit rate selected from the plurality of the QAM constellations;

obtaining performance information for each optical path link for each of the optical WDM channel signals produced by a programmable optical transponder;

operating each of the programmable optical transmitters in each optical transponder under a selected QAM constellation that is selected from the plurality of the QAM constellations in the digital processing unit of the programmable optical transmitter based on the performance information for the respective optical path link;

providing a feedback mechanism in the optical network to communicate to the optical transponder a feedback signal indicative of a change of the performance of the optical path link for each optical WDM channel signal from a respective programmable optical transmitter; and operating a plurality of programmable optical transmitters to change a selected QAM constellation currently in use to a different QAM constellation when the respective change of the performance of the optical path link meets a pre-determined condition for changing the QAM constellation, wherein said operating the plurality of programmable optical transmitters includes operating a first programmable optical transmitter in the programmable optical transponder under a first QAM constellation at a first data rate in transmitting a first optical WDM channel signal along a first optical path link in the optical network; and operating a second programmable optical transmitter in the programmable optical transponder under a second QAM constellation at a second data rate lower than the first data rate in transmitting a second optical WDM channel signal along a second optical path link that is longer than the first optical path link.

21. A method for optical communications, the method comprising:

connecting a programmable optical transponder in an optical communication network, each programmable optical transponder comprising a plurality of programmable optical transmitters to produce optical WDM channel signals at different optical WDM wavelengths and a plurality of optical receivers for detecting optical WDM channel signals, each programmable optical transmitter comprising a digital signal processing unit that is programmed to include a plurality of different quadrature amplitude modulation (QAM) constellations with different data bit rates in controlling signal modulation of an optical WDM channel signal with a variable data bit rate selected from the plurality of the QAM constellations;

obtaining performance information for each optical path link for each of the optical WDM channel signals produced by a programmable optical transponder;

operating each of the programmable optical transmitters in each optical transponder under a selected QAM constellation that is selected from the plurality of the QAM constellations in the digital processing unit of the programmable optical transmitter based on the performance information for the respective optical path link;

providing a feedback mechanism in the optical network to communicate to the optical transponder a feedback signal indicative of a change of the performance of the optical path link for each optical WDM channel signal from a respective programmable optical transmitter; and operating a plurality of programmable optical transmitters to change a selected QAM constellation currently in use to a different QAM constellation when the respective change of the performance of the optical path link meets a pre-determined condition for chan in the QAM constellation, wherein said operating the plurality of programmable optical transmitters includes operating a first programmable optical transmitter in the programmable optical transponder under a first QAM constellation at a first data rate in transmitting a first optical WDM channel signal along a first optical path link in the optical network; and operating a second programmable optical transmitter in the programmable optical transponder under a second QAM constellation at a second data rate lower than the first data rate in transmitting a second optical WDM channel signal along a second optical path link that has a higher optical signal to noise ratio than the first optical path link.

22. The method as in claim 21, wherein:
the pre-determined condition for changing the QAM constellation includes a distance of the optical path link.

23. The method as in claim 21, wherein:
the pre-determined condition for changing the QAM constellation includes an optical signal to noise ratio in the optical path link.

24. The method as in claim 21, wherein:
the pre-determined condition for changing the QAM constellation includes a data bit error rate in the optical path link.

25. The method as in claim 21, wherein:
the pre-determined condition for changing the QAM constellation includes a data bit rate per wavelength in the optical channel signal.

26. The method as in claim 21, comprising:
using a least mean square value of a data bit error rate in the optical transmission link to indicate pre-determined condition for changing the QAM constellation.

27. The method as in claim 21, wherein:
configuring each programmable optical transmitter to include 2-QAM, 4-QAM, 8-QAM, 16-QAM, 32-QAM, 64-QAM, 128-QAM and 256-QAM in the plurality of the QAM constellations.

28. The method as in claim 21, comprising:
applying a coherent QAM detection scheme in detecting each optical WDM channel signal under a selected QAM constellation in the optical network.

29. The method as in claim 21, comprising:
maintaining the plurality of the QAM constellations to be at a fixed common baud rate.

30. A method for optical communications, the method comprising:

providing a plurality of programmable optical transmitters in an optical node in a network, each programmable optical transmitter comprising a plurality of different quadrature amplitude modulation (QAM) constellations with different data bit rates and operating to control signal modulation of an optical channel signal with a variable data bit rate selected from the QAM constellations;

determining optical transmission performance of optical path links for transmitting optical channel signals from the optical transmitters in the optical node, respectively, based on at least one of an optical path link length and an optical signal to noise ratio for each of the optical path links to select one of the QAM constellations for each optical transmitter to control the signal modulation, wherein the determining of the optical transmission performance of optical path links is performed by:
  performing a test on each optical path link to measure the optical transmission performance; and
  using the measured optical transmission performance in the test to select a QAM constellation for the optical path link; and
operating the optical transmitters in the optical node under the selected QAM constellations with different data bit rates.

31. The method as in claim 30, comprising:
determining the optical transmission performance of optical path links based on engineering design rules for designing the optical path links.

32. A method for optical communications, the method comprising:
  providing a plurality of programmable optical transmitters in an optical node in a network, each programmable optical transmitter comprising a plurality of different quadrature amplitude modulation (QAM) constellations with different data bit rates and operating to control signal modulation of an optical channel signal with a variable data bit rate selected from the QAM constellations;
  determining optical transmission performance of optical path links for transmitting optical channel signals from the optical transmitters in the optical node, respectively, based on at least one of an optical path link length and an optical signal to noise ratio for each of the optical path links to select one of the QAM constellations for each optical transmitter to control the signal modulation, wherein the determining of the optical transmission performance of optical path links is performed by:
    measuring the optical transmission performance at a receiver end of each optical path link;
    operating a feedback signal to inform a respective optical transmitter of the measured optical transmission performance at the receiver end; and
    using the measured optical transmission performance in the feedback signal to operate the optical transmitter in selecting a QAM constellation for the optical path link; and
  operating the optical transmitters in the optical node under the selected QAM constellations with different data bit rates.

\* \* \* \* \*

UNITED STATES PATENT AND TRADEMARK OFFICE
CERTIFICATE OF CORRECTION

PATENT NO. : 7,986,878 B2
APPLICATION NO. : 12/026545
DATED : July 26, 2011
INVENTOR(S) : Ross Alexander Saunders et al.

It is certified that error appears in the above-identified patent and that said Letters Patent is hereby corrected as shown below:

In Claim 21, column 18, line 12, delete "chan in" and insert --changing-- therefor.

Signed and Sealed this
Twenty-seventh Day of September, 2011

David J. Kappos
*Director of the United States Patent and Trademark Office*